(12) United States Patent
Dresch

(10) Patent No.: US 11,134,665 B2
(45) Date of Patent: Oct. 5, 2021

(54) ICE FISHING TRAP

(71) Applicant: James V. Dresch, Alexandria, MN (US)

(72) Inventor: James V. Dresch, Alexandria, MN (US)

(*) Notice: Subject to any disclaimer, the term of this patent is extended or adjusted under 35 U.S.C. 154(b) by 0 days.

(21) Appl. No.: 15/932,089

(22) Filed: Feb. 8, 2018

(65) Prior Publication Data

US 2018/0249694 A1 Sep. 6, 2018

Related U.S. Application Data

(60) Provisional application No. 62/499,880, filed on Feb. 7, 2017.

(51) Int. Cl.
*A01K 97/01* (2006.01)
(52) U.S. Cl.
CPC ............................ *A01K 97/01* (2013.01)
(58) Field of Classification Search
CPC ........ A01K 97/01; A01K 81/00; A01K 69/00; A47F 5/08
See application file for complete search history.

(56) References Cited

U.S. PATENT DOCUMENTS

| | | | |
|---|---|---|---|
| 3,694,950 A * | 10/1972 | Maier | A01K 97/01 43/4 |
| 5,048,220 A | 9/1991 | Harris | |
| 5,140,767 A * | 8/1992 | Traut | A01K 97/01 210/470 |
| 5,784,824 A * | 7/1998 | Myroniuk | A01K 97/01 43/4 |
| 5,967,532 A * | 10/1999 | Mooney | A01K 97/01 180/186 |
| 6,568,120 B2 | 5/2003 | Smolinski | |
| 6,684,553 B1 | 2/2004 | Holum | |
| 7,162,826 B1 | 1/2007 | Zander | |
| 8,943,735 B2 | 2/2015 | Brown et al. | |
| 9,439,406 B1 * | 9/2016 | Kuny | A01K 97/14 |
| 2011/0056112 A1 * | 3/2011 | Christianson | A01K 97/10 43/17 |

* cited by examiner

*Primary Examiner* — Darren W Ark
*Assistant Examiner* — William L Gmoser

(57) ABSTRACT

An ice fishing trap (10) includes an arm (16), leg (28) and pivotal plate (30) actuated by a pedal (34) in order to trap a caught fish within an ice hole so that it cannot escape if it gets off the hook.

7 Claims, 6 Drawing Sheets

ICE FISHING TRAP

TECHNICAL FIELD

The present invention relates generally to ice fishing, and more particularly to an apparatus for selectively closing an ice hole to prevent a fish from escaping after being caught.

BACKGROUND OF THE INVENTION

Ice fishing is a popular winter sport with its own particular challenges. In warm weather one can fish in open water from the shore, or off of a dock or a boat. However, fishing during the winter is typically done through a hole drilled through the ice. The fisherman sits out in the open, or inside of a shelter such as a fish house, with his line in the water while waiting for a fish to strike.

One frustrating thing about ice fishing is that a fish can easily be lost while being lifted out of the water from an ice hole. In contrast to fishing in warm weather, there isn't enough room in the ice hole to put a net under the fish in case it gets off the hook. It is not unusual in ice fishing for a fish to become unhooked and then disappear back into the water and down the ice hole. The fisherman may or may not be able to react quickly enough to reach into the hole and grab the fish before it gets away.

Various devices have been available heretofore to trap a fish within an ice hole so that it cannot get away. U.S. Pat. Nos. 9,439,406, 6,568,120 and 5,048,220 are representative of the prior art in this regard. However, these devices tend to be overly complicated and somewhat expensive.

A need has thus arisen for a new and improved ice fishing trap.

SUMMARY OF THE INVENTION

The present invention comprises an ice fishing trap that overcomes the foregoing and other difficulties associated with the prior art. In accordance with the invention there is provided a new and unique ice fishing trap that is adapted for placement directly into an ice hole from the surface of the ice, or from the floor of an ice house located over the ice hole. The ice fishing trap herein is selectively manually actuated to close off the bottom of the ice hole to keep a fish from getting away if it get off the hook while being lifted out of the ice hole. The ice fishing trap herein is of adjustable length, relatively simple construction, and can be broken down for compact storage when not in use.

BRIEF DESCRIPTION OF DRAWING

A better understanding of the invention can be had by reference to the following Detailed Description in conjunction with the accompanying Drawing, wherein.

DETAILED DESCRIPTION

Figure 1:
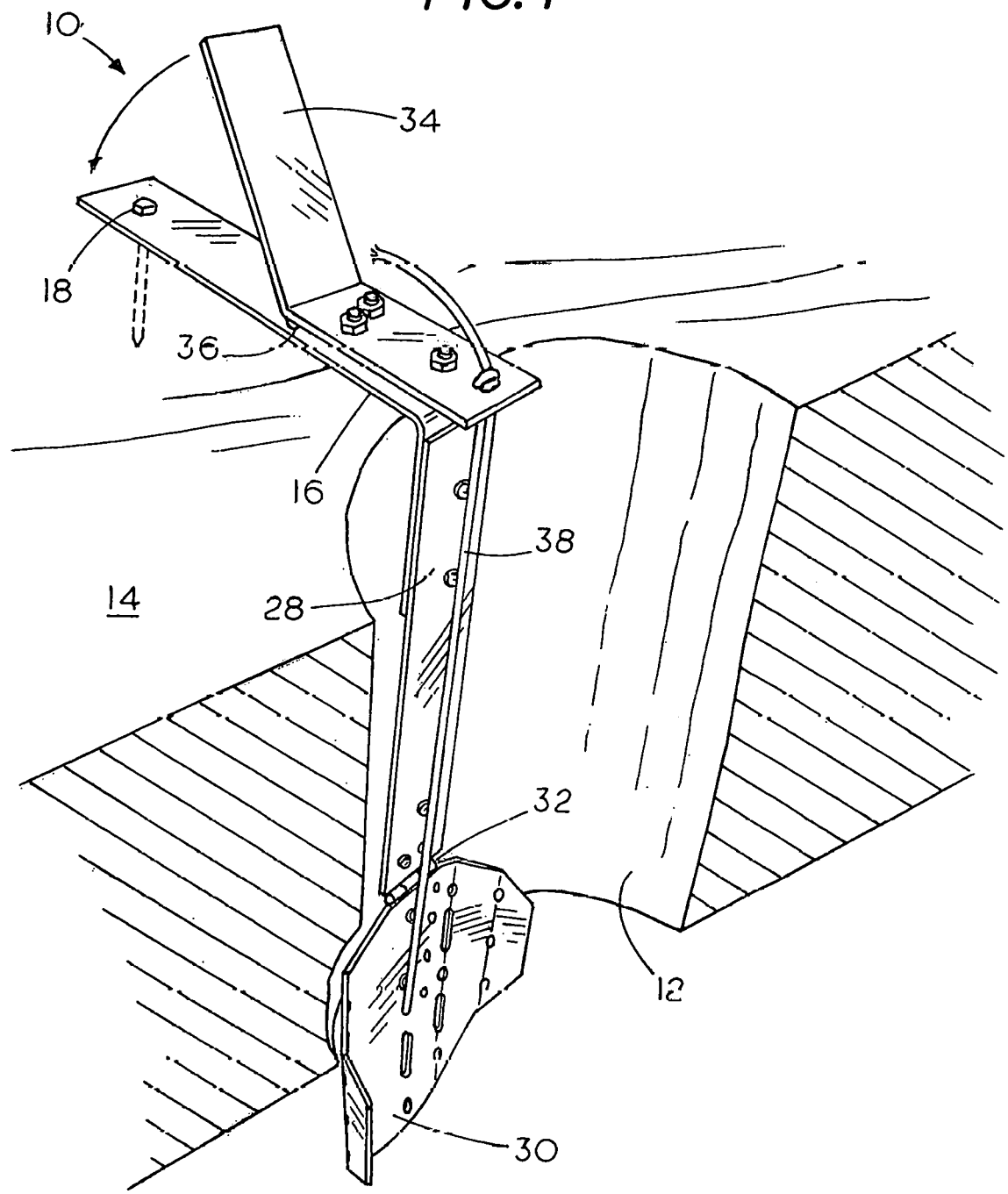
FIG. 1 is an illustration of the ice fishing trap according to a the invention herein shown mounted directly on the ice, shown in an open position.
Figure 2:
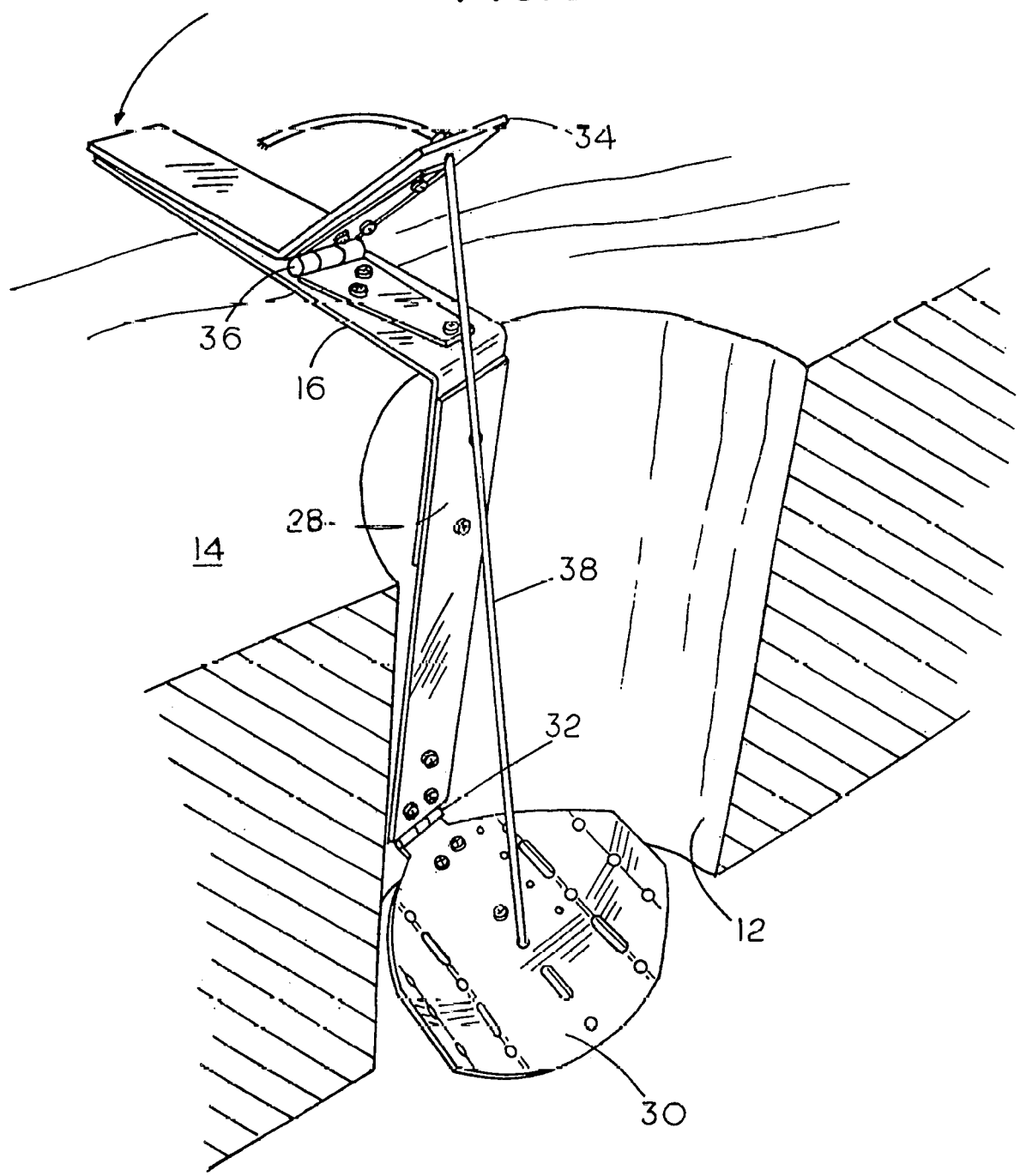
FIG. 2 is an illustration similar to FIG. 1, but showing the ice fishing trap herein in a closed position.

Referring now to the Drawings, wherein like reference numerals designate like or corresponding elements throughout the views, there is shown an ice fishing trap 10 according to the invention herein mounted in a hole 12 in the ice 14. The hole 12 is usually made with an auger (not shown) and can be of any diameter, but is typically about eight to ten inches in diameter. The depth of hole 12, of course, depends upon the thickness of ice 14.

Figure 3:
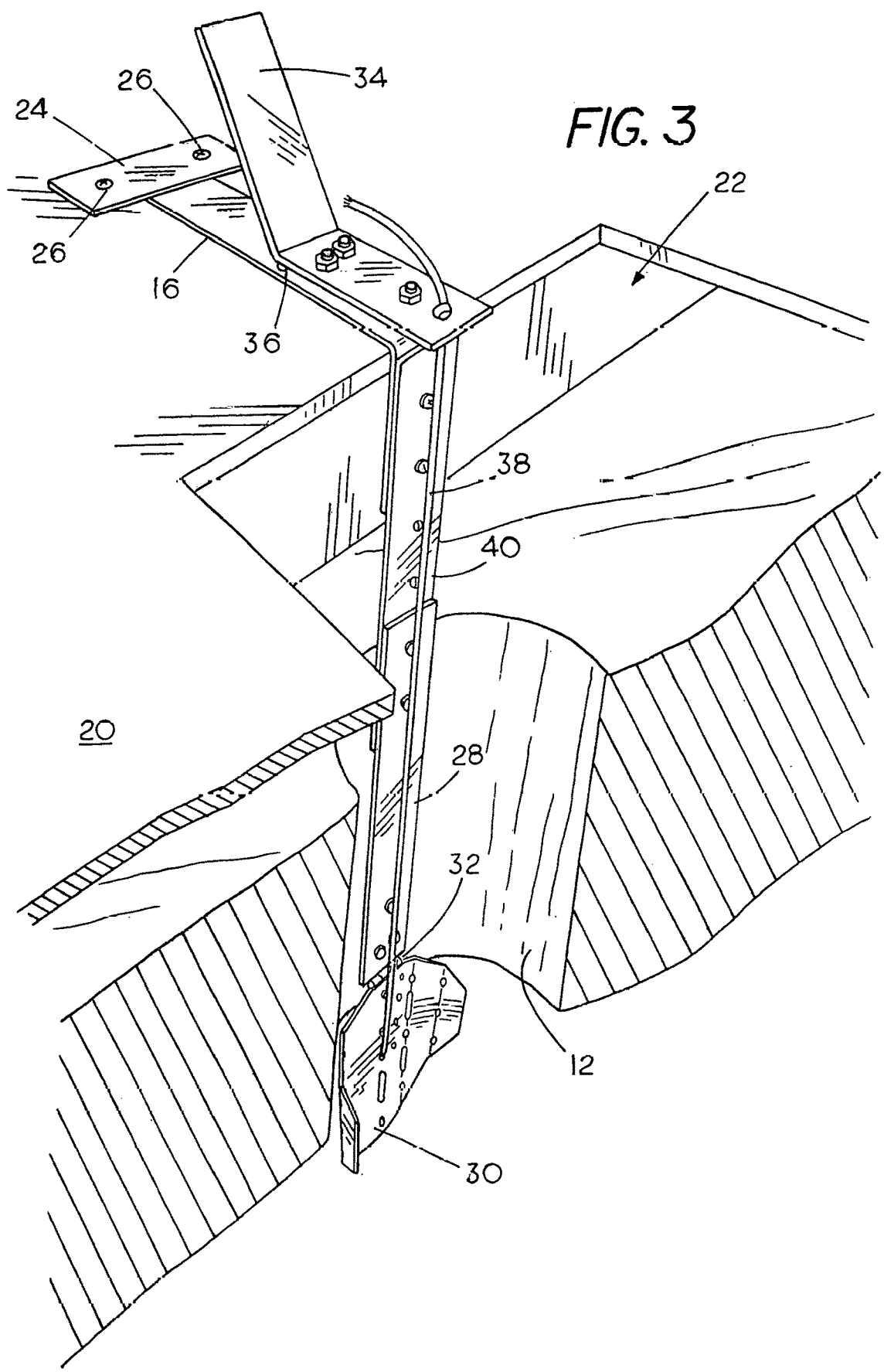
FIG. 3 is an illustration of the ice fishing trap according to the invention herein shown mounted on the floor of an ice house, shown in an open position.

The ice fishing trap 10 includes an L-shaped arm 16 having generally horizontal and vertical ends. The horizontal end of arm 16 can be secured directly to the ice 14 by a lag bolt 18, as shown in FIG. 1. Or the horizontal end of arm 16 can be secured to the floor 20 of an fish house 22 by a cross plate 24 and screws 26, as shown in FIG. 3.

A generally straight leg 28 is secured to the vertical end of the L-shaped arm 16 within the hole 12. In the preferred embodiment, the vertical end of arm 16 and the upper end of leg 28 have sets of equally spaced apart, corresponding holes for receiving bolts or screws with nuts as shown for adjusting the length depending upon the depth of hole 12.

A generally circular plate 30 is pivotally secured to the lower end of leg 28 by a hinge 32 for movement between raised and lowered positions. Hinge 32 is secured between leg 28 and plate 30 by bolts or screw with nuts as shown.

In the preferred embodiment, plate 30 is not flat, but is curved as shown so as to lie along the side of ice hole 12. Plate 30 is also preferably perforated as shown in order to minimize drag when moving between the lowered and raised positions.

Plate 30 can be selectively actuated manually by means of a generally V-shaped pedal 34 pivotally secured to the horizontal end of arm 16 by hinge 36. Hinge 36 is secured between arm 16 and pedal 34 by bolts or screws with nuts as shown. A piece of rope or string 38 is connected between pedal 34 and plate 30, which is normally gravitationally biased in the lowered position. The rope or string 38 is flexible and inextensible, and can be knotted as shown to adjust its length depending upon the height of trap 10 and the depth of the ice hole 12. If desired, a section of chain with links could be substituted for rope or string 38.

FIG. 3 shows an optional extension 40 that can be used to make the ice fishing trap 10 longer, such as when used in a fish house 22, for example.

Except for rope or string 38, sections of galvanized metal, plastic or other suitable material may be used to construct the components of ice fishing trap 10 herein.

Figure 4:
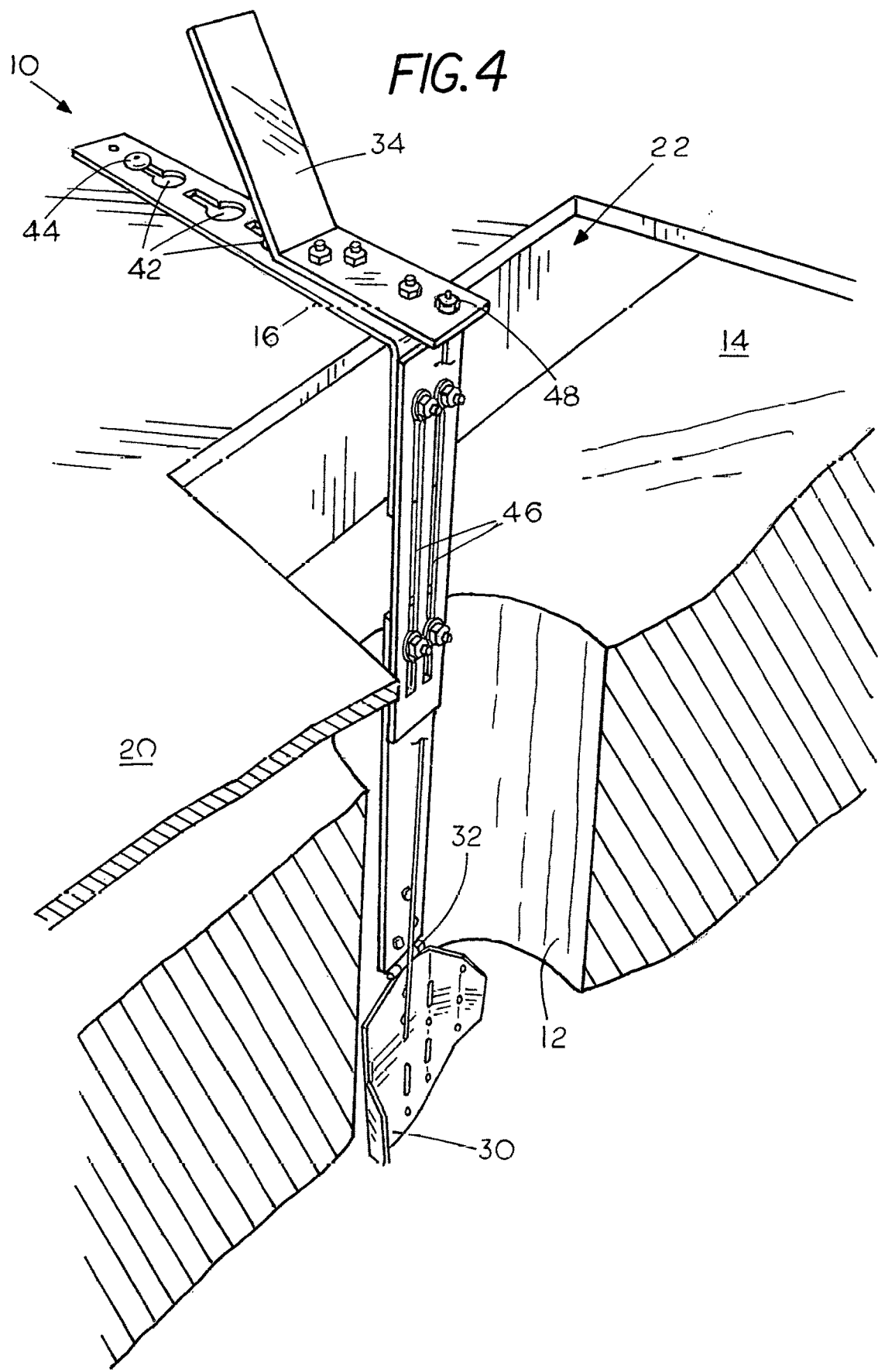
FIGS. 4 and 5 are illustrations showing modifications to the ice fishing trap of the invention herein, shown in the open and closed positions, respectively.
Figure 5:
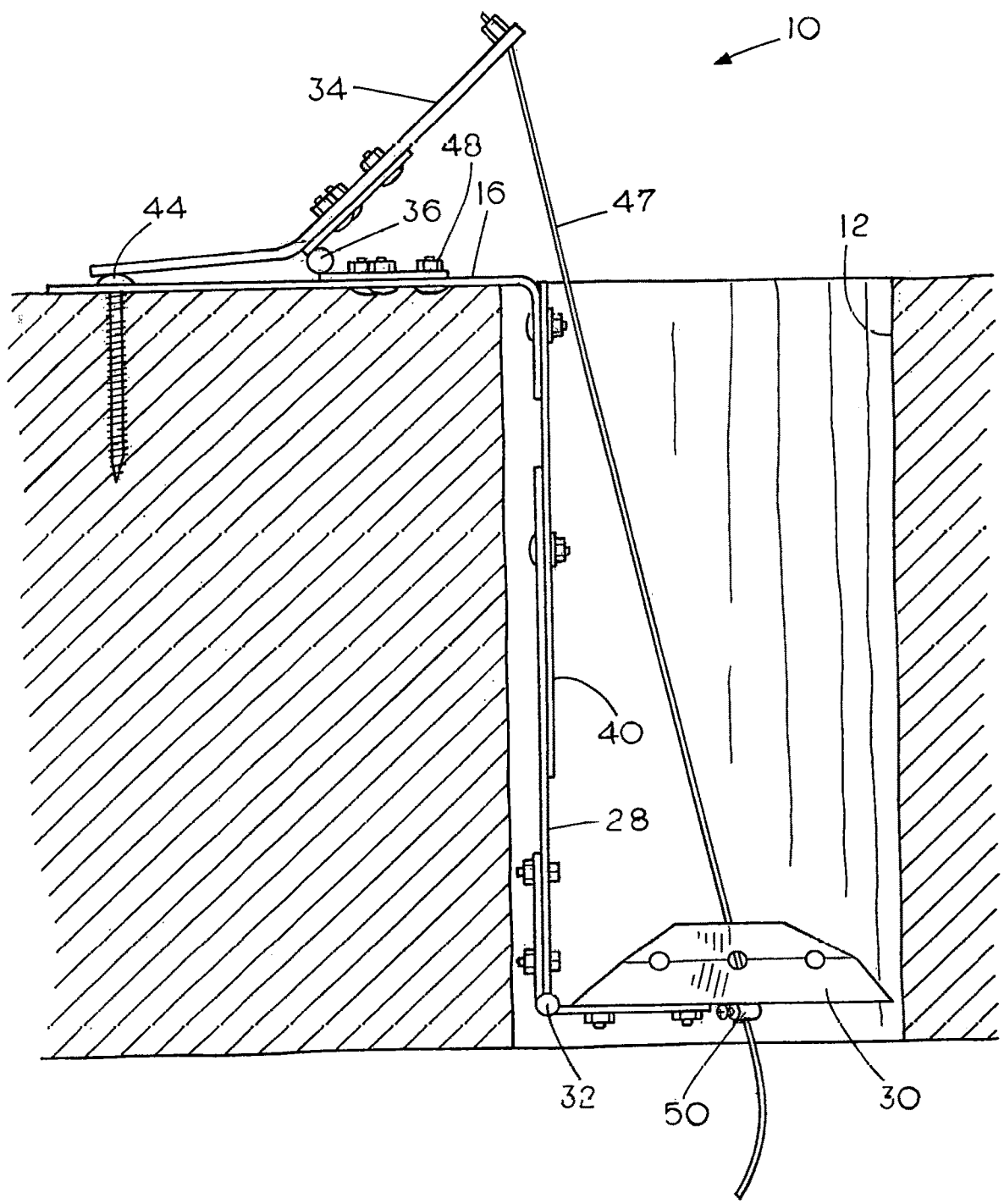
Figure 6:
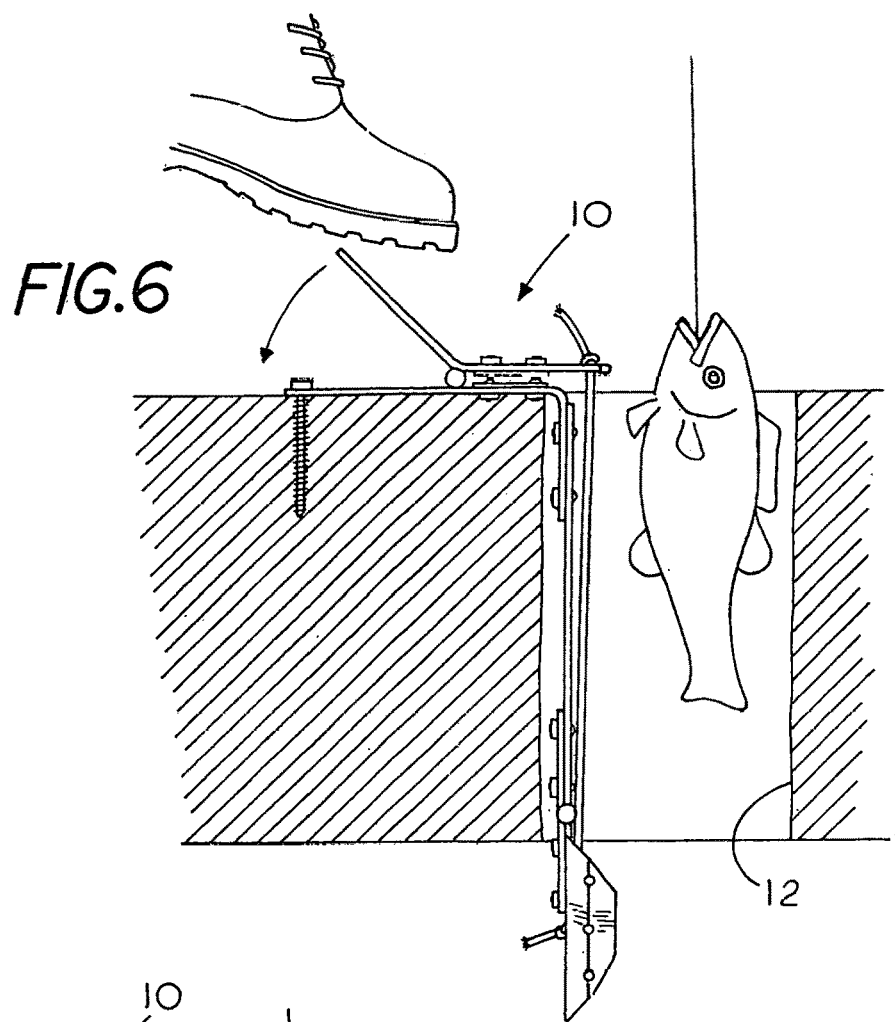
FIGS. 6 and 7 are illustrations showing how a fish would be captured with the ice fishing trap herein after being caught and getting unhooked.
Figure 7:
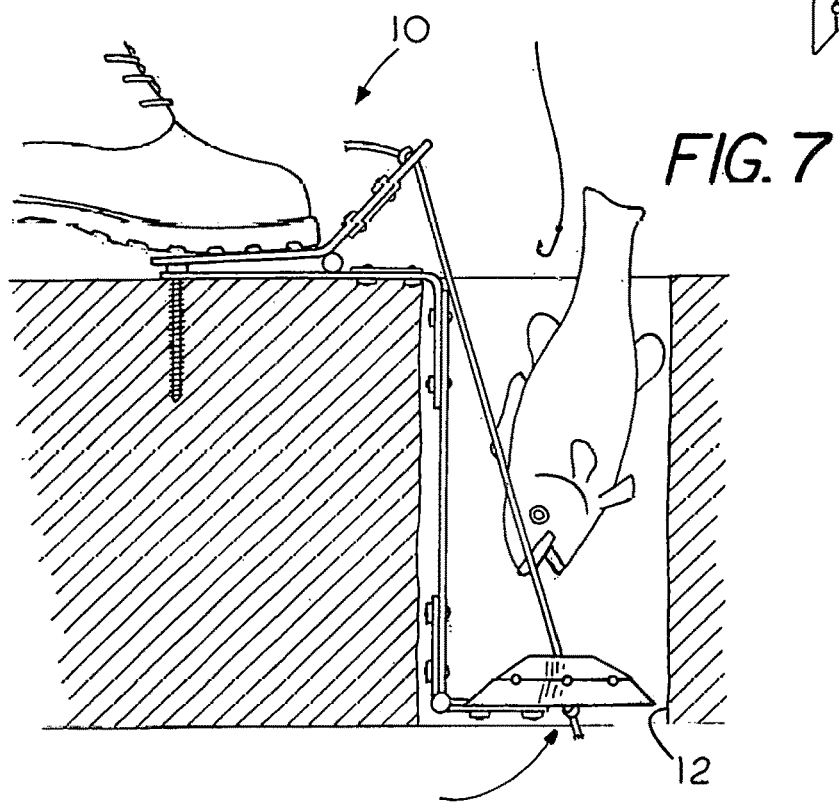

FIGS. 4 and 5 show some modifications that can be incorporated into fish trap 10, if desired. Instead of a hole for for receiving lag bolt 18, one or more key-shaped holes 42 can be provided in the horizontal end of arm 16 for receiving a bolt or screw 44, which can be left in the floor 20 of fish house 22 for convenience. This is also a substitute for cross plate 24 and screws 26.

Another modification is the provision of longitudinal slots 46 in extension 40, instead of a plurality of spaced-apart holes, for more adjustability. The extension 40 would still be secured to the lower end of arm 16 and the upper end of leg 28 with bolts or screws with nuts as shown, but with better adjustability.

Yet another modification is the provision of a length of cable 47 interconnecting pedal 34 and plate 30. The upper end of cable 47 is secured to pedal 34 by a bolt or screw with nut 48, instead of being knotted, if rope or string were used. The lower end of cable 47 extends through a hole in plate 30 and is secured by a spring-loaded friction nut 50 for convenient adjustability of its length depending upon the height of the fish house floor 20 above ice 14 and the depth of hole 12. This also facilitates knock down of the fish trap 10 for storage or shipment.

As explained above, plate 30 is preferably perforated in order to minimize drag when moving between lowered and raised positions. Round and elongated perforations are shown, however, it will be understood that any suitable shape or size perforations can be used in any suitable arrangement.

From the foregoing, it will be appreciated that the present invention comprises an ice fishing trap having several advantages over the prior art. If a fish gets off the hook while or after being lifted out of the water, the fisherman can quickly close of the ice hole to prevent it from getting away. The ice fishing trap herein is of relatively simple and inexpensive construction, and can easily be broken down or partially disassembled for compact storage and transport when not in use. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any equivalents, modifications and/or rearrangements of elements falling within the scope of the invention as defined by the following Claims.

What is claimed is:

1. An apparatus for selectively trapping a caught fish within an ice hole so that it cannot escape, which comprises:
   a generally horizontal arm configured to be disposed on the ice adjacent to the ice hole;
   a generally vertical leg having upper and lower ends, the upper end of said leg being attached to said arm and the lower end of said leg extending downwardly into the ice hole;
   a generally circular, arcuate plate pivotally secured to the lower end of said leg, said plate being configured to be disposed within and alongside of the ice hole;
   said plate having predetermined perforations therein;
   said plate being movable between a lowered position disposed at least partially inside the ice hole, and a raised position disposed inside and extending across the ice hole;
   said plate being normally gravitationally biased towards the lowered position so that said plate moves entirely by gravity from the raised position to the lowered position;
   a generally V-shaped foot pedal having opposite ends and being pivotally secured between the ends thereof to said arm; and
   means including a flexible but substantially inextensible link connected between one end of said foot pedal and said plate for selectively moving said plate between the lowered and raised position when the other end of said foot pedal is actuated to prevent a fish from escaping out the ice hole after being caught.

2. The apparatus of claim 1, further including:
   means releasably connected between said arm and said leg for selectively adjusting positioning of said plate within the ice hole.

3. The apparatus of claim 1, further including:
   means for securing said arm in a predetermined fixed position adjacent to the ice hole.

4. An apparatus, for selectively trapping a caught fish within an ice hole so that it cannot escape, which comprises:
   a generally horizontal arm configured to be disposed on the ice adjacent to the ice hole;
   a generally vertical leg having upper and lower ends, the upper end of said leg being attached to said arm and the lower end of said leg extending downwardly into the ice hole;
   a generally circular plate pivotally secured to the lower end of said leg, said plate being configured to be disposed within the ice hole;
   opposite sides of said plate being curved so as to lie substantially within and alongside of the ice hole when in the lowered position;
   said plate being movable between a lowered position disposed at least partially within and inside the ice hole, and a raised position extending across the ice hole;
   said plate being normally gravitationally biased towards the lowered position so that said plate moves entirely by gravity from the raised position to the lowered position;
   said plate including a plurality of predetermined perforations therein;
   means releasably connected between said arm and said leg for selectively adjusting vertical positioning of said plate within the ice hole;
   a generally V-shaped foot pedal having opposite ends and being pivotally secured between the ends thereof to said arm; and
   means including a flexible but substantially inextensible link connected between one end of said foot pedal and said plate for selectively moving said plate between the lowered and raised position when the other end of said pedal is actuated to prevent a fish from escaping out the ice hole after being caught.

5. The apparatus of claim 4, further including:
   means for securing said arm in a predetermined fixed position adjacent to the ice hole.

6. An apparatus for selectively trapping a caught fish within an ice hole so that it cannot escape, which comprises:
   a generally horizontal arm configured to be disposed on the ice adjacent to an ice hole;
   a generally vertical leg having upper and lower ends, the upper end of said leg being secured to said arm and the lower end of said leg extending downwardly into the ice hole;
   a generally V-shaped foot pedal, said foot pedal having opposite ends;
   means for pivotally securing said foot pedal between the ends thereof to said arm;
   a generally circular plate pivotally secured to the lower end of said leg, said plate being configured to be disposed within the ice hole;
   said plate being movable between a lowered position disposed at least partially within and inside the ice hole, and a raised position extending across the ice hole;
   said plate being curved inward at opposite sides thereof so as to lie substantially within and alongside of the ice hole when in the lowered position;
   said plate being normally gravitationally biased towards the lowered position so that said plate moves entirely by gravity from the raised position to the lowered position;

said plate including a plurality of predetermined perforations therein;

means including a plurality of corresponding holes and associated releasable fasteners connected between said arm and said leg for selectively adjusting vertical positioning of said plate within the ice hole; and means including a flexible but substantially inextensible link connected between one end of said foot pedal and said plate for moving said plate from the lowered position to the raised position in response to selective actuation of the other end of said pedal in order to prevent a fish from escaping out of the ice hole after being caught.

7. The apparatus of claim 6, further including:

means for releasably securing said arm in a predetermined fixed position adjacent to the ice hole.

\* \* \* \* \*